UNITED STATES PATENT OFFICE.

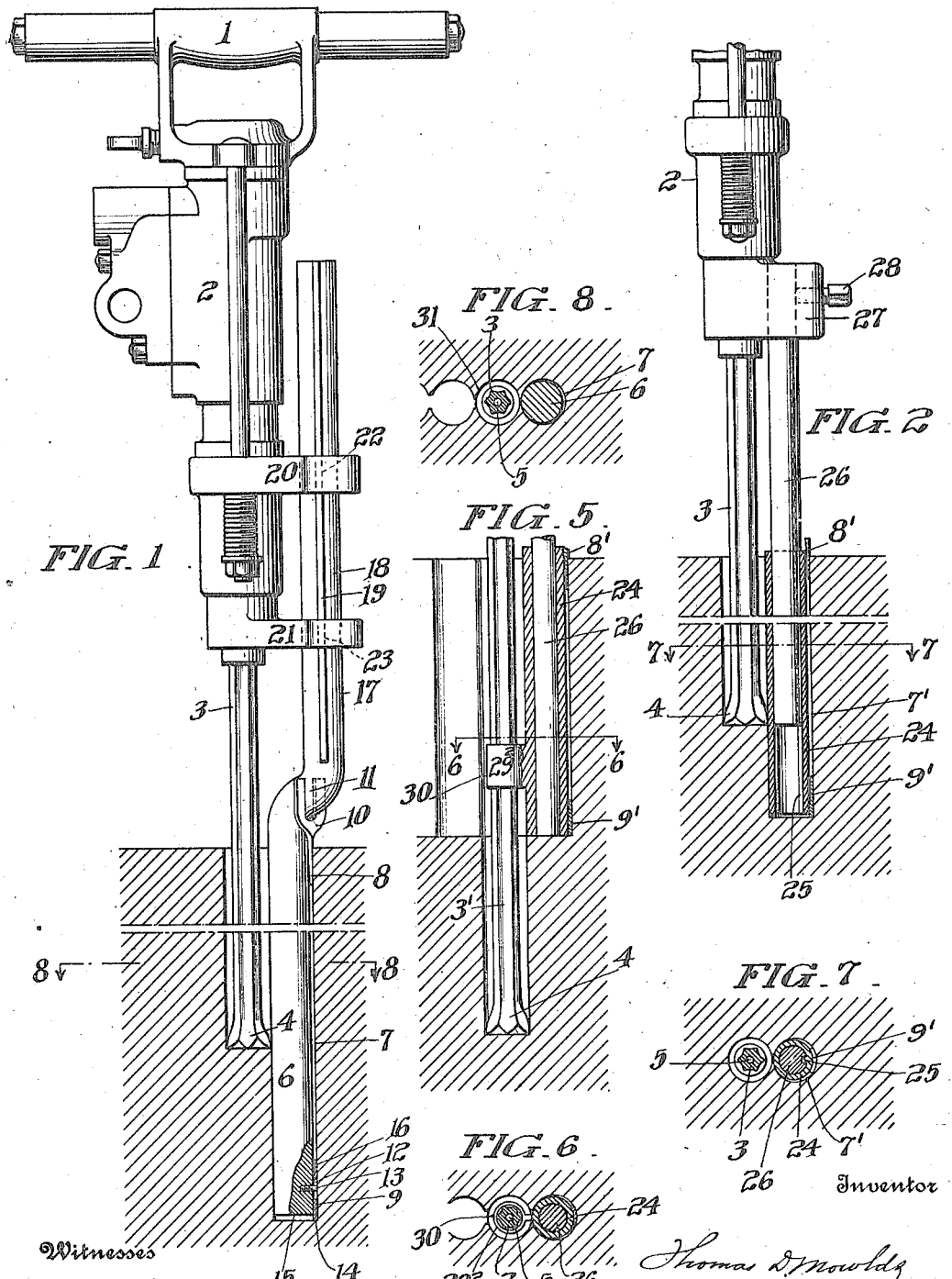

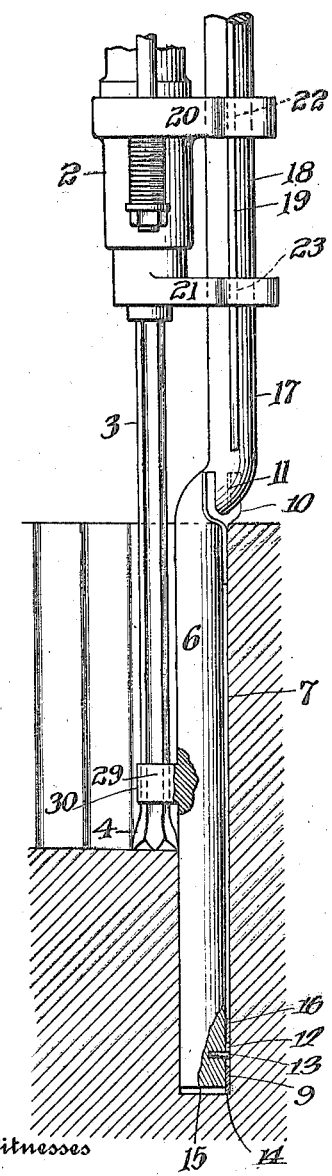
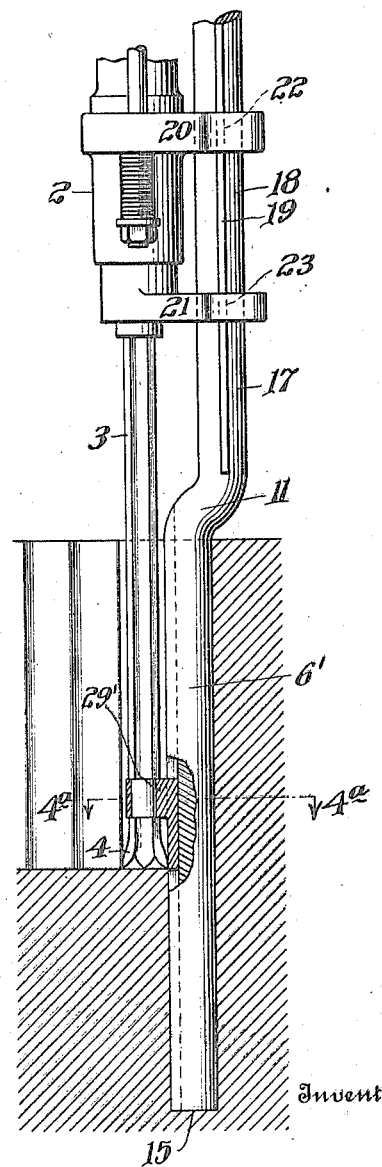
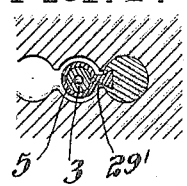

THOMAS D. MOWLDS, OF BALA, PENNSYLVANIA.

CHANNELING ATTACHMENT FOR IMPACT ROCK-DRILLS.

1,264,424.                Specification of Letters Patent.      Patented Apr. 30, 1918.

Application filed August 25, 1915.   Serial No. 47,245.

*To all whom it may concern:*

Be it known that I, THOMAS D. MOWLDS, a citizen of the United States, residing at Bala, in the county of Montgomery and State of Pennsylvania, have invented a certain new and useful Channeling Attachment for Impact Rock-Drills, of which the following is a specification.

My invention relates to the adaptation of drilling tools of impact type to the art of cutting channels in solid rock.

The purpose of my invention is to anchor a guide firmly within a single hole already drilled, preventing rotation, as well as rocking and to direct the drilling tool for the next hole by the guide so held, maintaining the drill parallel with the hole already made and in the plane of the intended channel during its cutting operation. I then advance the guide to the hole thus drilled and progress by these successive operations along the plane of the channel.

A further purpose of my invention is to support a drill and the material being drilled laterally against movement toward a contiguous hole or collapse into it by filling the hole up tightly against the adjacent side of the material being drilled.

A further purpose of my invention is to wedge an anchor at the top and bottom within the last hole drilled, maintaining it against rotation by the wedges and utilize this anchor directly as a guide or as a support for a guide for the drill cutting the adjoining hole, successively advancing the guide and drill as each hole is completed.

A further purpose of my invention is to maintain a drill spindle and guide member (connected rigidly or slidingly with an impact tool driving the drill) in parallelism like tines of a fork and thus to space and guide the spindle and drill point from an adjoining hole already drilled into which the guide member is inserted.

A further purpose of my invention is to adapt a single drill to extended channeling operations by providing a guide for the drill within a channel already cut, supporting the drill in this manner during the deepening of the channel.

After a channel has been drilled part of its depth, it is my further purpose to support a drill step by step within the holes of the channel already cut, while successive holes are drilled adjoining these and to a greater channel depth.

Further purposes will appear in the specification and claims thereof.

I have preferred to illustrate my invention by but a few of the many forms in which it may obviously be applied, selecting three which are practical, efficient and inexpensive and which at the same time well illustrate the principles of my invention.

Figure 1 is a side elevation, partly in section, of a drill and guide, capable of carrying out my invention.

Fig. 2 is a broken side elevation, partly in section of a drill and guide similar to those shown in Fig. 1, but representing a second form thereof.

Figs. 3, 4 and 5 are vertical sections, one broken through rock channels in which the drills and tools are in elevation, showing three additional forms of my invention.

Figs. 6, 7 and 8 are sections upon lines 6—6; 7—7 and 8—8, respectively, of Figs. 5, 2 and 1.

Fig. 4$^a$ is a section of Fig. 4 on line 4$^a$—4$^a$.

Similar numerals of reference indicate like parts in the drawings.

I have applied my invention to an old form of hand supported drill having the handle 1, drill body 2, drill spindle 3 and drill 4 and, preferably, with an opening throughout the length of the rod and drill, as at 5, through which the air used by the impact tool is exhausted to clear the chips and dust from the hole. I prefer to use not only an impact drill, but one of a type in which the tool is not raised between blows. The tool and drill, as thus far described, are capable of cutting a circular hole to a considerable depth but, for convenience in holding the drill, the operation is carried out by successive cuts of approximately 18 inch depth each, changing the drill spindle and drill point between the successive cuts.

I have invented an effective and convenient attachment for an impact tool, which attachment requires but a single hole for its support and effectively protects against rotation. In the form shown in Fig. 1, the support carries a fixed guide member which extends above the rock. The support takes the form of a solid bar 6, preferably somewhat smaller in diameter than the hole, which is placed in the first hole 7 of the set drilled, and successively advanced from hole to hole, as each new hole is finished.

The support is carefully set to guide in the direction desired for the intended channel and is rigidly secured within the hole 7 by any convenient means of which I have found the best to be wedges at the top and bottom, here shown at 8 and 9 which are placed on the opposite side of the support from the proposed new hole. This holds the bar tightly against that edge of the existing hole adjacent to the hole being drilled and supports the drill and the material being cut, approximating as nearly as may be the conditions existing when drilling the first hole. The form of wedge selected at 8 is yoked at the top at 10 to straddle the bend 11 between the support and fixed guide member by which this member is given the spacing from the hole to be drilled which may be required by the type of impact tool used. The yoke permits this top wedge to be conveniently driven to place.

The lower wedge 9 is preferably slotted longitudinally at 12 to hang upon a pin 13 secured to the bar, so that the wedge shall normally hang loose at the lower end of the bar with its end 14 projecting considerably below the end 15 of the bar and little enough of the thin end of the wedge above the bottom of the bar to avoid risk of the wedge being forced upwardly by engagement with the side walls of the hole and tightened as the bar is dropped. When the lower end 14 of the wedge strikes the bottom of the hole the wedge will be stopped and continued movement of the bar will cause the outer surface of the wedge to be forced out against the side wall 16 of the hole by the continued engagement of the outside face of the bar support or rod with the inner surface of the wedge. When it is desired to remove the support, both of these wedges will release readily.

The fixed guide member 17 which I have illustrated in Fig. 1 is of generally circular section, as at 18, but is made effectively non-circular for guiding purposes. In the illustration, a radially extending fin 19 is used for this purpose. It is rigid with the guide. Upon the tool 2 at any suitable height to coöperate with the fixed guide member, I form a movable (sliding) coöperating guide member here shown as comprising two lugs or clamps 20 and 21 rigidly secured to the impact tool and interiorly conforming at 22 and 23 with the exterior contour 18 and 19 of the fixed guide member.

It will be seen that the tool will be fed downward along the fixed guide member throughout the range designed and that the drill spindle 3 will be maintained not only in parallelism with the support 6, whose position is determined by the adjacent hole, but may be located with great exactness directly in advance of it along the line of the channel to be cut.

In Fig. 2 I have shown a second form by which this guiding function is effected, reversing the guide structure and having the male member thereof travel with the tool rather than as rigid with the support. The fixed guide member is again located in the hole previously drilled and the movable guide member is rigid with the tool. In this form I fill the hole 7' by a supporting tube 24 which may be wedged to place at top and bottom by wedges 8' and 9 in the same manner as in the first form of my invention. The exterior of this tube may be regarded as the support and the interior thereof as the fixed guide member, in analogy to the form shown in Fig. 1.

It will be noted that the fixed guide member is here below the stone level and coaxial with the support. By this tube the hole in the stone is transformed into a straight and regular guide for the tool. The tube is here interiorly splined, as at 25 to prevent rotation of a movable guide member, here a rod 26 guided therein. The rod is longitudinally slotted in conformity with the spline. The rod is rigidly connected with the drill frame as by lug 27 and set screw 28. If desired the rod 26 may be advanced in the lug below its position in the figure to bring it below the drill point at the commencement of the hole to guide well at the start, and may be moved to the position shown after the hole is well under way.

The operation of the second form is the same as the first except that the slotted rod 26, the movable guide member, secured to the drill frame moves in and out of the interiorly splined fixed guide and support 7' here, whereas the lugs in the first form move upon the upwardly projecting, finned, fixed guide member, rod 17.

In the forms shown in Figs. 3, 4 and 5, I have applied my invention to the deepening of a channel which has already been partially cut throughout the length of the channel.

In each of these figures I have supplemented the action of the fixed and movable guide members by a supplemental guide connecting the drill spindle and support or fixed guide down in the channel while permitting relative axial movement between them.

Taking up the form in Fig. 3, I first drill one hole at the end of the channel to the depth to which the second channel is intended to be cut. I then apply a fixed guide member 6 which may be wedged to place, if desired. There is not the same reason, however, here for preventing rotation of the guide and revolution of the spindle about it, as sides of the channel already cut assist in this function.

The movable guide members connected with the impact tool 2 may here be of the same general character as those shown in Fig. 1, and the drill spindle and drill point may be identical with those except that a longer spindle would here be used.

At a point upon the fixed guide member 6, sufficiently above the bottom of the first channel cut to give room for the drill point below, I secure a supplemental guide 29 to the fixed guide member and pass the drill spindle through the end 30 of this guide, forming this end so as to encircle the drill spindle sufficiently to support primarily against movement toward and from the fixed guide member.

It will be evident that the fixed guide may be maintained rigidly against rotation and that the drill spindle may in the same way be prevented from revolution about the axis of the fixed guide member 6, if desired.

The operation of this form of my invention is substantially the same as that of the form shown in Fig. 1, with the difference that the drill spindle is placed in position within the supplementary guide before the fixed guide member 6 is placed in position, and that the walls of a hole in the first portion of the channel depth cut, say the next hole to the end thereof, are used to retain the fixed guide during the drilling of the first hole in the deepened channel section and the walls of successive adjoining holes in the first portion of the channel depth are used to support the fixed guide for successive adjoining holes in the deepened portion of the channel.

In the form shown in Fig. 4, the construction is almost identical with that shown in Fig. 3, except that the supplementary guide 29' is fixed to the drill spindle and moves vertically along or within a guide, upon or in a fixed guide member 6'.

It will be evident that the supplemental guide will pass down into the channel which is being cut and that it may be made firm enough to break through the narrow wall of stone between the two adjacent holes, if it be not desirable to cut the second hole directly into the first.

In both of the forms shown in Figs. 3 and 4, the device is intended to be advanced successively to place the fixed guide in successive holes, as they are cut, as is generally true of the construction shown in Figs. 1 and 2.

In the form shown in Fig. 5, I have formed the fixed guide member as a tube 24 interiorly splined, if desired, to prevent rotation of a movable guide member 26 and have intended to use a drill spindle and drill, impact tool and connection between the drill and rod 26 of the same character as shown in Fig. 2, except that the drill spindle here will be of greater length to reach the lower depths required for the deepening of the channel.

The tube 24 may be rigidly fixed against rotation, if desired, though, as in the case of Figs. 3 and 4, the reasons for securing the fixed guide member against rotation in the hole and the movable guide member against rotation about the fixed guide member, are less where the channel is being deepened than where an initial channel is being cut.

Upon the fixed guide member I place a supplemental guide $29^2$, preferably rigid with the fixed guide and movable relatively with respect to the spindle 3' so that the spindle may receive support and guidance at this point down in the first channel during the drilling of the successive holes in the second channel.

It will be evident that the supplemental guide should be located far enough above the bottom of the portion of the channel already cut to give room for the drill point below it and that the fixed guide member should be inserted after the drill spindle has been dropped into initial position.

It will further be evident that with this form of my invention the fixed guide member will form a guide for drilling below the depth of its own lowest level and that the first of a series of holes for a deepening of the channel may be drilled with this attachment, though the device must be turned a half turn to drill the last hole in such a case, if the deepened portion of a channel is to have the same length.

From Fig. 8 it will be seen that there will normally be sufficient rock between adjacent holes to support the fixed guide member in any hole of the portion of the channel already cut and to receive the thrust of the wedges against the portions 31 of the rock, if it be desired to use the wedges here.

It will be evident that in all of my forms I provide a pair of coöperating guide members, one of which is fixed within a single hole and the other movable upon or within it; and that both of my main forms shown are operative with supplemental guides where it is desired to use them for additional support in deepening an existing channel. The fixed guide member may be located either above or below the level of the stone at which the holes are being started and may be coaxial with the hole by which the one guide member is fixed or laterally spaced therefrom. The general mode of operation and the process carried out are substantially the same with all of my forms.

Having thus described my invention, what I claim as new and desire to secure by Letters Patent is:—

1. In a device for drilling successive, closely adjacent holes in rock, a support adapted to enter a drilled hole, means for securing it rigidly in the hole, a non-circular fixed guide above the rock carried by the support, an impact drilling tool, a movable guide upon the tool coöperating with the fixed guide, a drill spindle and drill carried by the tool and an offset between the support and fixed guide bringing the drill closely adjacent the hole already drilled.

2. In a device for drilling successive, closely adjacent holes in rock, a support adapted to enter a drilled hole, means for securing it rigidly in the hole to support the walls of the hole on the side toward the next hole to be drilled, a non-circular fixed guide above the rock carried by the support, an impact drilling tool, a movable guide upon the tool coöperating with the fixed guide, a drill spindle and drill carried by the tool and an offset between the support and fixed guide bringing the drill closely adjacent the hole already drilled.

3. In a device for drilling successive, closely adjacent holes in rock, a support adapted to enter a drilled hole and having substantially the contour on the side toward the next hole to be drilled, of the wall of the hole in which it is placed, means for rigidly securing the support in the hole with this contour against that wall of the hole adjoining the next hole to be drilled, a non-circular fixed guide above the rock and carried by the support, an impact drilling tool, a drill spindle and drill carried thereby and a movable guide upon the tool coöperating with the fixed guide to hold the drill closely adjacent the support.

4. In a device for drilling successive, closely adjacent holes in rock, a support adapted to enter a drilled hole, means for securing it rigidly in the hole, a non-circular fixed guide above the rock carried by the support, an impact drilling tool, a drill spindle and drill carried thereby, a movable guide upon the tool coöperating with the fixed guide to prevent rotation of the tool with respect to the fixed guide and a guide for the drill secured against lateral movement with respect to the support, below the surface of the rock and through which the drill spindle is adapted to pass, to hold the drill close to the hole already drilled.

5. In a device for drilling successive, closely adjacent holes in rock, a support adapted to enter a drilled hole, means for securing it rigidly in the hole, a non-circular fixed guide above the rock carried by the support, an impact drilling tool, a drill spindle and drill carried thereby, a movable guide upon the tool coöperating with the fixed guide to prevent rotation of the tool with respect to the fixed guide and a guide for the drill secured against lateral movement with respect to the support and through which the drill spindle is adapted to pass, to hold the drill close to the hole already drilled.

6. In a device for drilling successive, closely adjacent holes in rock, a support adapted to enter a drilled hole, means for securing it rigidly in the hole, a non-circular fixed guide carried by the support above the rock, an impact drilling tool, a drill spindle and drill carried thereby, a movable guide upon the tool coöperating with the fixed guide to prevent rotation of the tool with respect to the fixed guide and a guide for the drill secured against lateral movement with respect to the support and through which the drill spindle is adapted to pass, to hold the drill close to the hole already drilled.

7. In a device for drilling successive, closely adjacent holes in rock, a support adapted to enter a drilled hole, means for securing it rigidly in the hole, a non-circular fixed guide carried by the support above the rock, an impact drilling tool, a drill spindle and drill carried thereby, a movable guide upon the tool coöperating with the fixed guide to prevent rotation of the tool with respect to the fixed guide and a guide for the drill rigid with the support and through which the drill spindle is adapted to pass, to hold the drill close to the hole already drilled.

8. In a device for drilling successive, closely adjacent holes in rock, an impact drilling tool, a drill spindle and drill carried thereby, coöperating guiding members for the drill tool, a fixed support for one of the guiding members adapted to enter a hole adjoining that to be drilled and a wedge for the fixed support carried by the lower end of the support and adapted to be set by further downward movement of the support after the wedge engages the bottom of the hole.

9. In a device for drilling successive, closely adjacent holes in rock, an impact drilling tool, a drill spindle and drill carried thereby, coöperating guiding members for the drill tool, a support for one of the guiding members adapted to enter a hole adjoining that to be drilled and top and bottom tighteners holding the support rigid in the hole in which it is placed, the latter comprising a wedge for the support carried by the lower end of the support and adapted to be set by further downward movement of the support after the wedge engages the bottom of the hole.

THOMAS D. MOWLDS.

Witnesses:
 HELEN E. MOWLDS,
 GERTRUDE BADER.

Copies of this patent may be obtained for five cents each, by addressing the "Commissioner of Patents, Washington, D. C."